Sept. 19, 1961 T. SWEDLOW ET AL 3,000,774
LAMINATED OBJECTS AND METHOD FOR FABRICATING SAME
Filed May 12, 1958
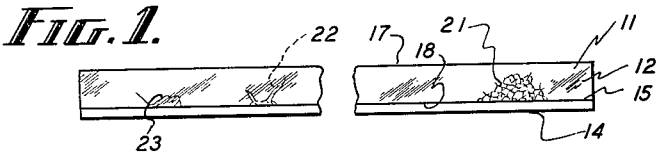
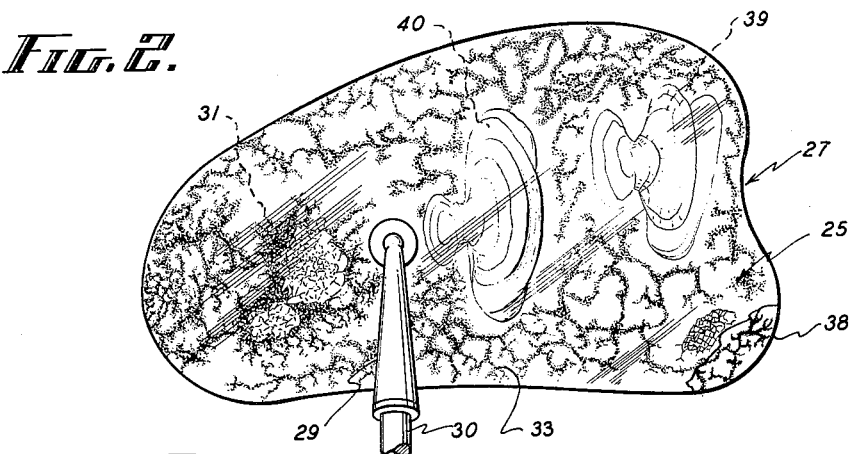
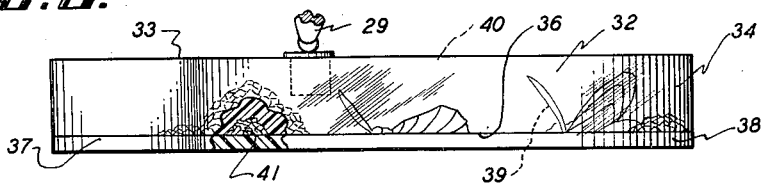
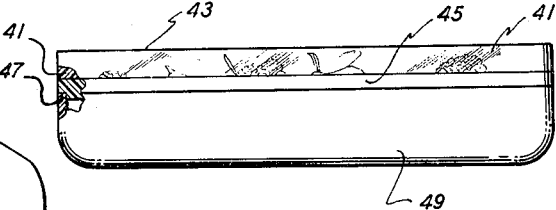
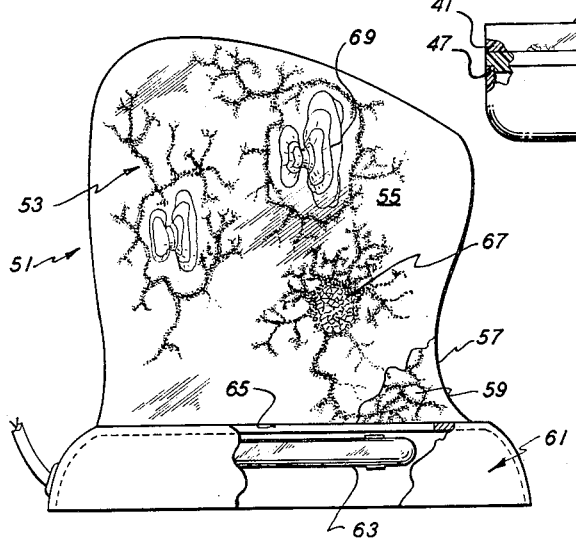
INVENTORS.
THEODORE SWEDLOW
SVEND SONDERGAARD
BY
W. J. Gribble
AGENT United States Patent Office 3,000,774
Patented Sept. 19, 1961

3,000,774
LAMINATED OBJECTS AND METHOD
FOR FABRICATING SAME
Theodore Swedlow, 628 Alameda St., and Svend Sondergaard, 575 Stonehurst Drive, both of Altadena, Calif.
Filed May 12, 1958, Ser. No. 734,546
11 Claims. (Cl. 154—121)

This invention relates to laminated objects and to processes for manufacturing such objects.

Laminated panels and other laminated objects have many advantages, particularly in the field of decoration. Laminates may be employed for wall panels, room dividers and, in smaller applications, as bases for desk pens, cigarette lighters, etc. Laminated plastic panels have been used in conjunction with decorative objects which are impressed between layers of the plastic panel. The plastics used are translucent or transparent so that the decorative objects are visible in the face of the panel. Butterflies and plant forms exemplify the type of decorative material usually compressed between the panel layers to enhance the beauty of the panel.

We have invented a lamination and a process for fabricating the same which eliminates the need for extraneous objects to decorate the panels, and which takes full advantage of the optical properties of some of the plastic materials most suited to panel construction. The process of the invention contemplates steps whereby a first layer of translucent or transparent material has fracture interfaces induced in it by the application of force to localized areas of one of its faces. A layer of pigmented adhesive is pressed between the fracture face of the first panel layer and a mating face of a second panel layer, the second panel layer being substantially similar in shape and area to the first. The two panel layers are then separated a slight amount to permit the partially set adhesive layer to coalesce in a random pattern. Then the two layers are pressed together and the adhesive is allowed to set.

The external configuration of the layers may be shaped into final form either before or after the bonding step. For example, desk sets and lighter bases may be cut from large laminated panels, or they may be shaped prior to lamination. Wall panels may be made directly from large plastic sheets in their commercially available form, without shaping.

If the layers are of a polymeric material having a "memory" characteristic, the panels may be shaped after lamination in accordance with the process described in our co-pending application Serial Number 658,387 filed May 10, 1957 and entitled Method for Manufacture of Three-Dimensional Objects.

The process of the invention results in a lamination which has superior strength qualities as well as decorative beauty. The fracture interfaces reflect and aberrate light in a fascinating manner. Use of pigmented adhesives forms a background for the fracture patterns. Proper timing of the interval in which the first and second layers of the panel are separated may result in adhesive patterns suggestive of forest scenes, underwater panoramas, or other fanciful backgrounds. The fractures may be induced in a manner resulting in figures and patterns resembling undersea life or fossil deposits.

Plexiglas material has been used with gratifying artistic results. The side edges of panels made with Plexiglas first layers may be optically polished so that a different aspect is apparent from each angle of viewing. A particularly pleasing effect from an esthetic standpoint is achieved when such panel is edge lighted.

The background may be adapted to suit the particular fracture interface pattern. Properly sharpened and applied tools, when used in conjunction with a Plexiglas layer result in fracture formations which closely resemble seashells, starbursts and other forms of sea life. With the proper amount of separation of the two layers the pigmented adhesive coalesces in a pattern reminiscent of sea ferns, making a striking background for the sea life patterns simulated by the fracture interfaces in the first layer.

The invention contemplates an object of manufacture which comprises a first portion of light transmitting material having fracture interfaces emanating from localized areas on one of its faces and extending into it, a second portion bonded to the fracture face of the first portion, and a pigmented layer disposed between the first and second portions.

A preferred embodiment of the object of manufacture of the invention includes a light source arranged to radiate through the first layer. The light rays reflect from the fracture interfaces and are aberrated by the fractures. Rays are also diffused by the first layer material itself, particularly if the material is one similar to Plexiglas. Such an object is useful as a night light, giving a dim and diffused illumination in the room in which it is used.

In an alternative process the step wherein the first layer has fracture interfaces induced in it may be preceded by a process step wherein the layer is heated. Then the fracture is induced as described, and the layer is reheated. The rest of the process is the same as described above.

The second heating step of the alternative process seals the exterior fracture traces, leaving a smooth surface closing an internal fracture interface.

Advantages of the objects and the process of the invention are apparent in the following detailed description and drawing, in which:

FIG. 1 is a fragmentary elevation of a laminated panel in accordance with the invention;

FIG. 2 is a plan view, partially broken away, of an object of manufacture made in accordance with the invention and utilized as a base for a desk pen;

FIG. 3 is an elevational view, partially broken away, of the pen base of FIG. 2;

FIG. 4 is an elevational view, partially broken away, of a container embodying the invention; and, FIG. 5 is an elevational view, partly in section, of a night lamp in accordance with the invention.

Referring now to the drawing, FIG. 1 illustrates a laminated panel 11 having a first layer 12, a second layer 14, and an interposed layer of pigmented adhesive 15. The first layer has a substantially planar outer face 17 and an obverse face 18.

Obverse face 18 has been subjected to localized pressure, preferably by sharp instruments. The localized pressure results in fractures starting from the face and penetrating into the body of the layer. Several such fractures are visible in the figure, fracture pattern 21 suggesting a starburst, and fractures 22 and 23 being suggestive of razor shell clams or other bi-valves or seashells.

In accordance with the inventive process the obverse face of the first layer has been patterned by inducing the fractures in that face, then the pigmented adhesive layer has been applied to a face of either the first layer 12 or the second layer 14. The two layers are then pressed together so that the fractured face 18 of the first layer is adjacent the adhesive layer. The two layers of the laminated panel are similar in shape and area so that there is substantially no projection of one beyond the periphery of the other.

Pigmentation may be achieved by the use of a plurality of liquid dyes suspended in an acrylic cement. The cement acts both as a vehicle for the dyes and as a bonding agent between the two plastic layers of the laminated panel. When the two panel layers are first pressed together, the bands of liquid color tend to spread across the interface between the two layers in a random pattern. By proper calculation, the pressure of the two plastic layers against the adhesive layer can cause the pigmented adhesive to spread in a pleasing pattern of random colors.

The two plastic layers are kept pressed together for a time interval sufficient to result in the desired amount of setting of the adhesive. Then the layers are separated a small distance so that the partially set adhesive may coalesce in a veined pattern. The desired pattern may be heavily veined or very delicately veined, and this effect may be controlled by the preliminary setting time of the pigmented cement prior to separating the layers, as well as by the distance that the layers are separated.

After the desired background pattern has appeared, the layers are brought back into contact and the adhesive bond left undisturbed until the layers are firmly joined in a decorative panel.

The panels may be of any size, limited only by the size of the raw sheets of plastic commercially available. They may be used as decorative architectural panels, such as room dividers, in store fronts to enhance merchandise displays, or as lighted ceiling panels.

FIG. 2 illustrates a desk pen 25 comprising a laminated base 27 into which a pen holder 29 is recessed. The pen holder receives a pen 30 which is shown fragmentarily. The same base could be adapted for use as a cigarette lighter base or a calendar holder. As seen more clearly in FIG. 3, the pen holder of FIGS. 2 and 3 comprises in the base thereof a first transparent layer 32 having a free shape and a polished top surface 33 and a polished peripheral surface 34. An obverse face 36 of the first layer is bonded to a second layer 37 by an intermediate adhesive layer 38.

Preferably, the first and second layers of the object of manufacture illustrated in FIGS. 2 and 3 are shaped prior to their lamination. They may be cut from their respective raw blanks by means such as a band saw, and then all of their surfaces including their peripheral edges polished so that they are optically clear. A preferred material is Plexiglas due to its light transmitting and fracturing qualities and its workability.

Either before or after shaping, fracture interfaces are induced in obverse face 36 of the first layer. The desired fracture patterns may be induced by using a series of varyingly sharpened chisel-like tools. A chisel having a curving sharp edge of some extent is driven against the obverse face. The shank of the chisel may be held at an angle to the plane of the face, and if proper pressure is applied, the fracture resulting from the pressure of the chisel will be the razor clamshell pattern illustrated at 39 and 40 in FIG. 2. A starburst pattern such as the starburst 41 is induced by pressure applied to the obverse face by a needle point chisel. The fracture interfaces result from a multiplicity of chisel impacts. As shown in the fragmentary sectional area in FIG. 3, the starburst pattern results from the actual hollowing, in a random fashion, of a localized area of the face. The starburst pattern suggests a silvery coral growth, as light emanates from the sculptured interfaces of the hollowed area.

The patterns achieved may be varied by an alternative process in which the layer to be fractured is heated before and after the fractures are induced in the layer. The fracture interfaces induced in heated materials vary from those induced in cold materials because of the greater plasticity of the heated material. For instance, patterns such as the clamshell pattern 39 of FIG. 2 have a lesser cleavage. Thus the patterns are less distinctive within a clear layer, giving a "softer" appearance. A second heating would seal the surface 36 so that internal pigmentation could not take place.

The described patterns are illustrative only, and the effects possible to the process of the invention are limited only by the imagination of the practitioner.

After the fracture patterns are induced in the first layer, a coating of adhesive, preferably the same pigmented cement described with respect to FIG. 1, is interposed between the first and second layers. A preliminary setting time commensurate with the desired background pattern is permitted to elapse before the two outer layers are separated the small distance necessary to allow the partially set adhesive to coalesce in the veined pattern. As in the embodiment of FIG. 1, the distance which the first and second layers are separated is determined by the effect desired. After the desired pattern is achieved from the separation, the two layers are again pressed together and held until the adhesive sets and bonds the two layers together.

In FIG. 4, a laminated object 41 having a first layer 43 and adhesive layer 44 and a second outer layer 45, has a peripheral groove 47 at its bottom edge. The laminated object 41 is fabricated in the manner described in conjunction with FIGS. 1 through 3. The peripheral groove 47 at the bottom edge mates with a container 49 which may be for storing jewelry or other small objects. Essentially the object 41 is a decorative closure for the container.

A night lamp 51 is illustrated in FIG. 5. The lamp includes a laminated panel 53 having an artistic free shape. The panel comprises a first layer 55 of Plexiglas, a second layer 57 similar in shape and area to the first layer, and a pigmented adhesive layer 59 which not only bonds the layer together but also presents a background for fracture patterns induced in an obverse face of the first layer by localized pressure.

Laminated panel 53 is fixed in an upright position to a lamp base 61. The lamp base is hollow and contains an elongated light source 63 which may be a Lumline bulb. Light rays from the bulb shine upwardly through a slot 65 in the top of the lamp base, and diffuse through the first layer of the laminated panel 53. Fracture interfaces such as the patterns 67, 69 diffuse and reflect the light rays. Preferably, the illumination level is low so that the diffused rays light the pigmented background faintly in contrast to the sparkling radiation from the fracture patterns in the first layer of the vertical panel.

The disclosed embodiments of the invention are illustrative of its versatility. While the embodiments shown have been described as utilizing Plexiglas in the first, or light transmitting, layer, other substances having similar properties of light transmission and response to fracture are useful in the process and in the objects of manufacture. The illustrative embodiments by no means exhaust the potentialities of the invention, its scope being defined in the appended claims.

We claim:

1. A process for the manufacture of laminated articles having a first and a second layer comprising the steps of inducing fractures in a face of a first light transmitting layer by applying force to localized areas of one of its faces, pressing an adhesive between the first layer and a second layer adapted to cover the fractured area of the first layer, the first layer being oriented with respect to the second layer so that the fractured face contacts the adhesive, separating the two layers to permit the adhesive to partly set in a random pattern of adhesive distribution, and rejoining the two layers until they are bonded.

2. Process in accordance with claim 1, wherein the adhesive contains pigment of at least one color.

3. Process in accordance with claim 1, wherein the first light transmitting layer is composed of Plexiglas material, and wherein the adhesive comprises an acrylic cement in which at least one color of pigment is included.

4. Process in accordance with claim 1, wherein the first light transmitting layer is heated prior to the step of inducing fractures in its face, and said layer is heated subsequent to said step of inducing fractures.

5. A process for the manufacture of laminated articles comprising shaping a first light transmitting blank having a plurality of optical faces, inducing fracture interfaces by applying force to localized areas of a face of the first blank, shaping a second blank adapted to cover the fractured area of the first blank, spreading a pigmented adhesive on a face of a blank, joining the adhesive covered face of the one blank to the other blank so that the fractured face of the first blank is substantially covered, pressing the two blanks together so that the adhesive spreads to a film like thickness, allowing the adhesive to partially set, separating the two blanks a distance sufficient to permit flow of the partially set adhesive into a random pattern, and rejoining the two blanks until they are bonded.

6. A process of manufacture for laminated articles comprising the steps of shaping a first transparent layer having a plurality of optical faces, inducing fracture interfaces in the first layer by exerting force against localized areas of a face thereof, creating sculptured interfaces in said face of the first layer, each type of interface being a light aberrating surface, shaping a second layer adapted to cover the fractured area of the first layer, spreading an adhesive on a face of a layer, joining the adhesive covered face of the one layer to the other layer so that the fractured face of the first layer is substantially covered, and joining the first and second layers until they are bonded by the adhesive.

7. A process for the manufacture of laminated articles comprising the steps of shaping a first light transmitting layer, inducing light refracting interfaces by applying force to localized areas of a face of the first layer, shaping a second layer adapted to cover the fractured area of the first layer, spreading a pigmented adhesive on a face of a layer, joining the adhesive covered face of the one layer to the other layer so that the fractured face of the first layer is substantially covered, pressing the two layers together so that the pigmented adhesive spreads to a film like thickness, allowing the adhesive to set partially, separating the two layers a distance sufficient to permit flow of the adhesive into a random distribution pattern, and rejoining the two layers until they are bonded.

8. Process in accordance with claim 7 wherein the step of spreading pigmented adhesive comprises applying adhesive of a first color and applying adhesive of a second color to an inner face of a layer, and wherein the separation step is carried out by separating the layers a distance within the elastic limits of the partially set adhesive.

9. An article of manufacture comprising a first layer of light transmitting material, fracture interfaces therein emanating from localized areas of a face of the layer, a second pigmented adhesive layer, and a third layer adapted to cover the fractured face of the first layer, the second layer lying between the first and third layers so as to bond them together.

10. An article of manufacture in accordance with claim 9 in which the pigmented layer varies in thickness in a random pattern.

11. An article of manufacture in accordance with claim 9 further comprising a light source adapted to direct light rays through the first layer so that the rays are intercepted by the fracture interfaces in the first layer.

References Cited in the file of this patent

UNITED STATES PATENTS

| | | |
|---|---|---|
| 1,219,853 | Okada | Mar. 20, 1917 |
| 1,923,070 | Belknap | Aug. 22, 1933 |
| 2,180,002 | Ford | Nov. 14, 1939 |
| 2,387,227 | Anderson et al. | Oct. 23, 1945 |
| 2,511,552 | Stuempzes | June 13, 1950 |
| 2,887,806 | Hassett | May 26, 1959 |

FOREIGN PATENTS

| | | |
|---|---|---|
| 396,313 | Great Britain | Aug. 3, 1933 |

OTHER REFERENCES

Rohm and Haas Reporter, vol. 4, No. 5 (December 1946), article entitled "Sculpture in Reverse," pages 6–8 and 12 relied upon.